UNITED STATES PATENT OFFICE.

HAROLD LAWDEN WOOD, OF MONTREAL, CANADA.

FOOD COMPOUND AND METHOD OF MAKING SAME.

No. 800,255.          Specification of Letters Patent.          Patented Sept. 26, 1905.

Application filed September 17, 1904. Serial No. 224,928.

*To all whom it may concern:*

Be it known that I, HAROLD LAWDEN WOOD, a subject of the King of Great Britain, residing at Montreal, Province of Quebec, Canada, have invented certain new and useful Improvements in Food Compounds and Methods of Making Same, of which the following is a specification.

This invention relates to food preparations; and the object is to produce a palatable, nutritious, and easily-digestible food, of which the main part of the solid constituents of milk and invert-sugar form the principal ingredients.

In carrying out this invention we may proceed in the manner following: To fresh milk is added about one and one-half its volume of water and the temperature of the diluted milk brought to about 15° to 20° centigrade. To the diluted milk is then added a very dilute acid—say two per cent.—in proportion sufficient to precipitate the casein of the milk. Hydrochloric acid is preferred. The acid under the above conditions will precipitate the casein in a fairly fine state of division, and the latter will carry down the butter-fat in the milk. It may be stated here that the milk employed may be full or whole milk or milk from which the butter-fat has been removed in part. The choice will be governed by the degree of richness desired in the product. After precipitation the mixture is filtered in order to separate the precipitate from the liquid and the precipitate washed by repeated agitation with water. The precipitate is then suspended in a filtering-cloth for two or three hours in order to remove the greater part of the water therefrom, when it is thoroughly combined with a small proportion of a mixture of sodium bicarbonate, three parts, and tripotassium phosphate, one part. From one to two per cent. of the mixture of salts, by weight, as compared with the weight of the casein when dry, may be employed. The addition of these salts renders the casein of the mass soluble in water, and they supply the necessary phosphate and sodium and potassium compounds. The mixture will still have a slightly acid-to-litmus reaction. A sufficient proportion of calcium still remains in the mass from the rather too-abundant proportion originally found therein, and a proper proportion of chlorin is derived mainly from the hydrochloric acid employed. It is preferred to add to the mass and thoroughly mix therewith ferric chlorid, manganese chlorid, trisodium citrate, and magnesium oxid suitable for producing a more complete food. These salts will be in small amount—say from 0.03 to 0.06 per cent. each—of the weight of casein (dry) in the mass. The main portion of all the above-added substances unite with the proteids, and thus become assimilable. The butter-fat in the milk remains in the emulsion state and is readily assimilated. The mass above described is now combined with invert-sugar syrup, preferably made from the best granulated sugar and having a consistency, preferably, rather thicker than that of honey. Of this syrup, from one-sixth to one-fourth of the volume of the above mass may be employed, and the two should be thoroughly mixed. A smaller proportion of the invert-sugar will, however, produce good results. In preparing the syrup care should be taken that no harsh taste is developed in its production. Flavoring ingredients may be added to the compound; but these are not essential to the invention.

The compound should be stored for use at a temperature not higher than 4° centigrade, at which temperature it may be preserved for months. After keeping the compound for a day or two succeeding its preparation at or below the above temperature an improvement in it is noted. This appears to be due to the completion of the chemical reactions, and it is also probable that the invert-sugar in the compound forms loosely combined products with the proteids.

The compound, which is in the form of a rather stiff paste, is extremely easy of digestion and assimilation and imposes far less work on the digestive and excretory organs than ordinary foods. It is a concentrated food containing little waste matter, and only a small quantity is needed for daily use.

It may be explained that the method of precipitation herein described of the butter-fat, casein, and, in part, the other proteids of the milk renders a large part of the calcium of the milk separable by the filtering and washing of the precipitate, that by it the butter-fat comes down in a state of fine division and is so evenly distributed through the mass that it does not clog the filter and is in proper condition for complete emulsification when the sodium bicarbonate and tripotassium phosphate are incorporated, and that the casein is precipitated in such degree of division as to adapt itself best for filtering and washing the precipitate.

It may be explained that milk deprived of a considerable part of its calcium and in a condition more solid than normal forms a nearly complete food for adults; but in deriving a product from milk which conforms to these conditions certain salts and the milk-sugar are in part removed or washed out. The invert-sugar substitutes the milk-sugar. The sodium bicarbonate and tripotassium phosphate supply the loss in sodium, potassium, and phosphorus and replace the excessive calcium and calcium phosphate removed from the casein. Loss of iron, manganese, magnesium, and the citrates is supplied by the small quantities of ferric chlorid, manganese chlorid, magnesium oxid, and trisodium citrate added.

The milk used should be pure and fresh to produce the best results or the best food product. The chemical substances used should also be pure and especially be free from arsenic.

As described, the compound is in the form of a stiff paste, and this is believed to be the best form; but the invention is not limited at all in this respect. The mass may be brought to a dry or nearly dry state, if preferred.

The rendering of casein soluble by means of chemical reagents is not broadly new and is not claimed herein, nor is it new to merely sweeten foods with sugar. Ordinary sugar is not employed in this compound, but invert-sugar, which is introduced as a part of the food compound and to replace the milk-sugar, and not for the purpose of adapting the food to the taste of the user.

Having thus described my invention, I claim—

1. A compound to form a food product, consisting of butter-fat, in a state of emulsion, casein, invert-sugar, sodium bicarbonate, tripotassium phosphate, ferric chlorid, manganous chlorid, trisodium citrate and magnesium oxid.

2. The herein-described method of preparing a food product, which consists in first diluting milk with about one and one-half its volume of water, then bringing the mixture to a temperature of about 15° to 20° centigrade, then mixing therewith sufficient hydrochloric acid to precipitate the casein of the milk, then filtering and washing the precipitate to remove a portion of the calcium therefrom, then removing a portion of the water from the mass, then mixing therewith salts to render the casein soluble, and also in small proportion, ferric chlorid, manganous chlorid, tripotassium citrate, and magnesium oxid, and finally incorporating invert-sugar with the mass.

In witness whereof I have hereunto signed my name, this 3d day of September, 1904, in the presence of two subscribing witnesses.

HAROLD LAWDEN WOOD.

Witnesses:
JOHN I. WALKER,
A. W. DERBY.